United States Patent [19]

McCoy

[11] 4,408,221
[45] Oct. 4, 1983

[54] TELEVISION CHROMA-KEY SYSTEMS

[76] Inventor: Reginald F. H. McCoy, Gainesville, Fla.

[21] Appl. No.: 304,588

[22] Filed: Sep. 22, 1981

[51] Int. Cl.³ .......................................... H04N 9/535
[52] U.S. Cl. .................................................. 358/22
[58] Field of Search ....................... 358/21, 22, 23, 39, 358/40, 36, 37

[56] References Cited

U.S. PATENT DOCUMENTS 3,560,638  2/1971  Skrydstrup .
3,595,987  7/1971  Vlahos .
3,778,542 12/1973  Hanseman .
4,007,487  2/1977  Vlahos ................................. 358/22

FOREIGN PATENT DOCUMENTS 2025187  1/1980  United Kingdom ................... 358/22
2059219  4/1981  United Kingdom ................... 358/22

Primary Examiner—Robert L. Richardson

[57] ABSTRACT

Chroma-key system combining an image of a foreground subject located in front of a colored backing, with a background image, in which limitations on the permissible colors of the foreground subject are reduced; and in which the chrominance and luminance of areas having the backing color in the foreground image are suppressed to prevent their undesired appearance in the combined image; and in which transitions in the signal indicating presence of the backing color are sharpened while maintaining amplitude proportionality to compensate for bandwidth limitation of the chrominance signal from which this indicating signal derives; and in which transitions in the chrominance component of the foreground signal at boundaries between subject and backing are similarly sharpened; and in which the luminance component of fine detail located in front of the backing is combined with the backing color indicating signal to include such fine detail in the combined image.

17 Claims, 4 Drawing Figures

TELEVISION CHROMA-KEY SYSTEMS

BACKGROUND OF THE INVENTION

Chroma-key is a technique, commonly used in the production of television programs, in which a foreground subject is placed in front of a backing of a specific color, the whole being viewed by a television camera, and electronic circuits are employed to substitute a different background image wherever this specific color appears, thus producing the effect that the foreground subject is in front of the background scene.

Present chroma-key equipments suffer from several defects. Firstly, to avoid unwanted insertion of the background image into the foreground subject, it is necessary to avoid the presence of a large range of colors, centered on the backing color, within the foreground subject. Secondly, where the edges of the foreground subject are not sharply defined, the color of the backing wall appear around the edges of the foreground subject, creating a spurious 'color halo' effect. If the user of the equipment attempts to avoid this problem by adjusting the equipment to suppress the foreground image when only a small amplitude of the backing color is detected, the desired diffuse detail of the edges of the foreground subject (for example, hair) will be sharply cut off.

This latter effect becomes more troublesome when the foreground video signal supplied to the chroma-key equipment is a composite encoded color signal, such as those according to the NTSC or PAL standards, rather than the red, green and blue signals originated by the camera. In encoded signals the bandwidth of the chrominance information is restricted, consequently transitions to and from the color of the backing are not sharply defined even if the foreground subject itself has sharp edges. With present chroma-key equipments operating from encoded signals it is usually necessary to set the equipment such that the edges of the foreground image are cut off to an objectionable extent, if color halo is to be avoided.

A third defect encountered when using encoded signals is that, due to the restricted chrominance bandwidth, fine detail of the foreground subject extending over the backing area is not passed in the chrominance signal and hence does not appear in the chroma-keyed image. Again hair is an example; strands of hair which appear in the original foreground image, being passed by the luminance bandwidth, do not result in a change in the chrominance signal (which controls the changing between foreground and background signals in the chroma-key equipment) and thus do not cause the chroma-key equipment to change from the background signal to the foreground signal as would be desired.

SUMMARY OF THE INVENTION

It is the aim of this invention to provide a chroma-key equipment in which, firstly, the range of colors within which substitution of the background image occurs is limited in order to avoid undue restriction on the colors which may be used in the foreground, this limitation being obtained by detecting chrominance components corresponding to departure from the backing color by predetermined amounts, detection of such components inhibiting the change from foreground to background signal; secondly, the color corresponding to the backing is removed from the foreground signal so that color haloes cannot occur; thirdly, the luminance component of the backing area is removed from the foreground signal so that the foreground subject appears in front of a black area to which the desired background signal may be added; fourthly, the transitions in the signal to be used to control the insertion of the background image are sharpened; fifthly, the chrominance transistions in the foreground video signal are also sharpened to avoid contamination of edges of the foreground subject by the backing color; sixthly, the chrominance signal employed to control the chroma-key action is modulated by high-frequency components in the luminance signal to restore the fine-detail information which was lost in the bandwidth limiting applied to the chrominance signal; and seventhly, the foreground signal is retained at full amplitude in all areas except where the backing color has attained full intensity to avoid attenuation of edge detail.

While the methods of this invention are primarily directed towards the improvement of chroma-key performance when using an encoded video signal source, they may also be applied to chroma-key systems which employ the direct red, green, and blue video signals originated by the camera before the encoding process to control the chroma-key action whereby selection is made between a foreground encoded signal and a background encoded signal to form the output signal.

DESCRIPTION OF THE DRAWINGS

The invention, both as to its organization and method of operation, together with further objects and advantages thereof, will best be understood with the aid of the following specification and attached drawings wherein.

DETAILED DESCRIPTION OF THE PREFERRED EMBODIMENT

Figure 1:
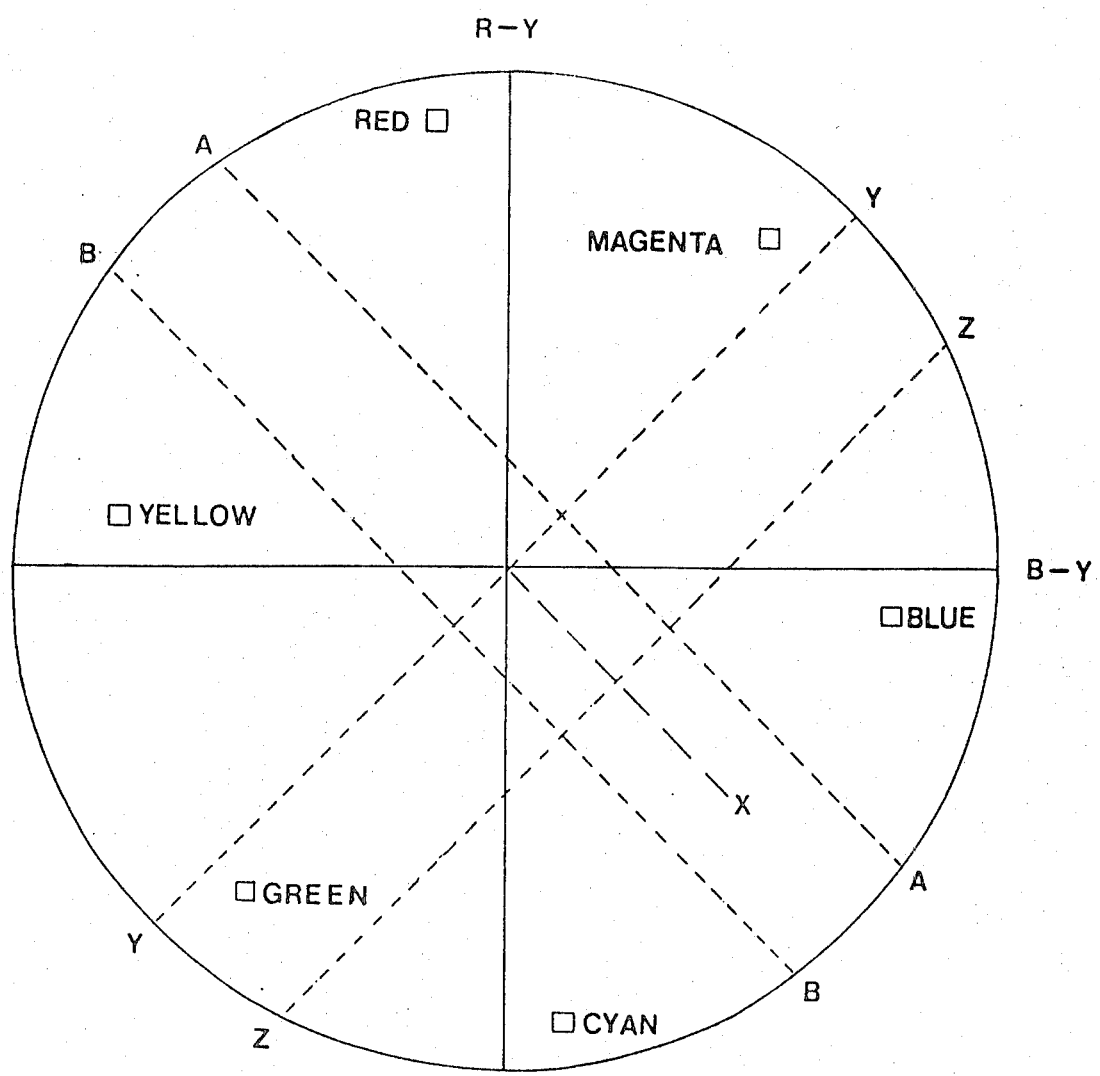
FIG. 1 is a vector diagram showing amplitudes and phases of a color subcarrier with particular reference to certain colors.

In the NTSC and PAL systems of color television, as is well known, two chrominance signals are transmitted by quadrature modulation of a subcarrier. In FIG. 1 is shown a vector diagram illustrating the amplitudes and phases corresponding to the colors red, yellow, green, cyan, blue, magenta. The horizontal axis of this diagram corresponds to the phase of the B-Y chrominance signal, and the vertical axis to the phase of the R-Y chrominance signal. (R denotes the red component, B denotes the blue component, and Y denotes the luminance of the color being transmitted). These two signals, being modulated on to quadrature phases of the same subcarrier frequency will produce the resultant amplitudes and phases shown for the colors indicated. In the NTSC system it is normal to employ linear combinations of the R-Y and B-Y signals, known as I and Q, (not shown), modulated on to quadrature phases at 33° to the R-Y and B-Y phases; the resultant amplitudes and phases for the colors are identical to those which would obtain if the R-Y and B-Y signals had been modulated directly on to the subcarrier in the phases shown. In the PAL system the R-Y phase is reversed on alternate lines, so that the phases shown in FIG. 1 are applicable on alternate lines; for the intervening lines the diagram of FIG. 1 should be considered as being inverted. These features of the NTSC and PAL systems are well known. Also in FIG. 1 is shown, at an arbitrary position X, the amplitude and phase corresponding to a possible color of the backing in a foreground image intended for use with chroma-key techniques.

In a conventional chroma-key equipment for use with an encoded, NTSC or PAL, signal, a synchronous demodulator may be employed whose phase is adjusted to correspond with that of the backing color shown at X in FIG. 1. The output of such a demodulator will be at a maximum in one polarity when the phase of the input signal is equal to the phase of X; it will be zero when the signal phase lies on the line YY at right angles to the direction of X; and will have the opposite polarity when the signal phase lies on the opposite side of line YY to the point X. The amplitude of the demodulator output is also proportional to the amplitude of the signal input.

In such a conventional chroma-key equipment a clipping level is normally provided which the amplitude of the demodulated signal must exceed before the chroma-key action takes place. The locus of colors having such a level for the amplitude of the signal is represented by the line ZZ of FIG. 1.

Any color producing an amplitude and phase of subcarrier corresponding to a point to the right of line ZZ of FIG. 1 will cause the chroma-key equipment to substitute the background image for the foreground image.

The preceding description is known art. It will be apparent from FIG. 1 that there exists a large range of colors (all those producing an amplitude and phase to the right of line ZZ) which will cause the background image to be selected. The occurrence of colors within this range in the foreground subject must be avoided if unwanted insertion of the background within the area of the foreground subject is not to take place. This imposes undesirable constraints on the colors of the foreground subject.

According to this invention the range of colors which will cause selection of the background signal, and which must therefore be avoided in the foreground subject, may be reduced by providing a second demodulator whose reference phase is in quadrature with that of the first demodulator, that is it lies along the line YY of FIG. 1. Any departure of the color from the phase of point X in a direction parallel to line YY will result in an output being produced by this second demodulator. By the provision of suitable comparator circuits an output from the second demodulator exceeding a preset level can be detected. In FIG. 1 line AA represents the locus of colors which will produce an output from the second demodulator having such a preset level, in one polarity, and line BB represents the locus of colors producing a similar level of opposite polarity. By arranging that outputs from the second demodulator which exceed the levels of line AA in one direction, or line BB in the opposite direction, will inhibit chroma-key action (that is selection of the background signal) the range of colors which will cause selection of the background signal will be limited to those lying between lines AA and BB and to the right of line ZZ. Accordingly only colors within this range need be avoided in the foreground subject, which can thus be free to include any colors except those close to the color of the backing, corresponding to point X.

Since the positions of lines AA, BB, and ZZ are determined by voltage levels which may be chosen at all, the area of colors which need to be excluded from the foreground subject can be selected. The minimum size of this area of colors is set by the need to accommodate variations in the amplitude and phase of the backing color vector. While this is nominally at point X, variations in the actual color of the backing; variations in the illumination of the backing; variations in the signal output of the camera at different points within the image area; and variations in the signal output of the camera with time, including random noise present in the signal, will all tend to cause the amplitude and phase of the backing color to depart from point X, and the separation of lines AA and BB and the position of line ZZ must be chosen to allow tolerance for the above variations. The major variable is normally the illumination of the backing, which primarily affects the amplitude of the chrominance signal from the backing, and therefore has most influence on the positioning of line ZZ.

A second feature of this invention is that color haloes around the edges of the foreground subject in the chroma-key image, which result from the unwanted appearance of the backing color, may be avoided by suppressing the backing color in the foreground image prior to the point at which the selection between foreground and background images takes place.

It will be understood that on transitions between subject and backing in the foreground image, the chrominance signal must change between the subject color and the backing color. During this transition it is possible for the chrominance signal to have a phase similar to that of the backing color with an amplitude that increases from zero to the full amplitude of the backing color. Even at low amplitudes the presence of a chrominance signal having a phase similar to that of the backing color in foreground image signal can cause a color halo.

Consequently it is desirable to suppress any chrominance in the foreground signal having a phase similar to the backing color, at any amplitude. The presence of such chrominance may be detected by the methods already described employing a synchronous demodulator with its reference in-phase with the backing color and a second synchronous demodulator with its reference in quadrature with the backing color the output of which is applied to two comparators one responding to outputs of one polarity exceeding a preset level, such as AA in FIG. 1, and the other responding to outputs of the opposite polarity exceeding a level such as BB in FIG. 1. The same demodulators and comparators as previously described for limiting the color range of the chroma-key action may be employed for this purpose. However, the output of the in-phase demodulator is taken before the clipper which, for the chroma-key action, was set to pass only signal amplitudes exceeding the level ZZ in FIG. 1. By taking the output before the clipper, any chrominance having a component with phase corresponding to the backing color will be present. Positive values of this output then indicate colors to the right of line YY in FIG. 1. By applying this signal to a further comparator an output may be obtained only for such positive values, and by using the output of the two comparators fed from the quadrature demodulator to suppress this signal, an output may be obtained only when the color lies between the lines AA and BB of FIG. 1. This output indicates the presence of the backing color at any amplitude.

The foreground video signal is split into two paths by filters so constructed that one will pass the chrominance component of the signal and the other will pass the luminance component. A gate is inserted in the chrominance path. The two paths are then recombined so that, when the gate is passing the chrominance signal, the output is indentical to the original foreground video signal.

By employing the signal from the comparator which indicates the presence of the backing color to control the gate in the chrominance path, the chrominance may be suppressed whenever the backing color occurs. The resulting foreground video signal will thus contain the full colors of the subject but be devoid of color in the backing and especially around the edges of the subject wherever a trace of the backing color was appearing in the original foreground signal.

The signal will at this point still contain the luminance contribution of the backing. A third feature of this invention is a method of suppressing this luminance component. Since the backing is normally a uniform color, the luminance signal and the amplitude of the chrominance signal originating from it will be proportional. Accordingly the output of the in-phase demodulator, when the backing color is present as indicated by the comparator output, will be proportional to the luminance contribution of the backing. An adjustable fraction of this demodulator output, gated by the signal indicating presence of the backing color, may be subtracted from the foreground video signal, to cancel the luminance contribution of the backing.

The result of suppressing the chrominance and canceling the luminance whenever the backing color is present will be a signal in which the foreground subject appears in front of a black background.

The restricted bandwidth of the chrominance information in an encoded color signal results in unsharp edges and lack of fine detail in the chrominance which when used to control the selection of the foreground or background signals can result in imperfect rendition of edge detail in the foreground subject.

A fourth feature of this invention is a method of sharpening the edge transitions in the chrominance signal.

Figure 2:
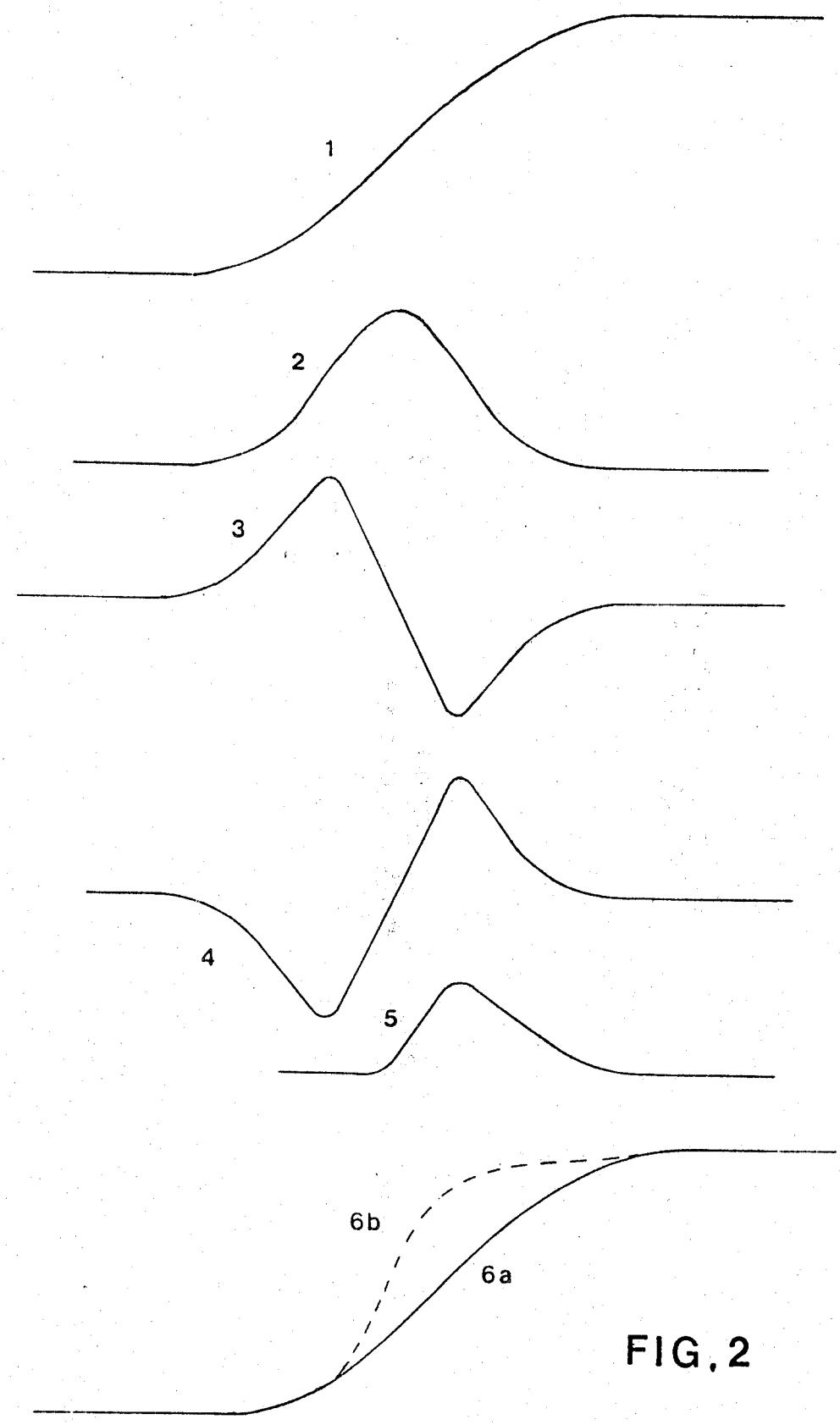
FIG. 2 shows waveforms associated with transitions from one level to another of a television signal.

Referring to FIG. 2 at 1 is shown a waveform having a slow transition from one level to another, as might occur in a bandwidth-limited chrominance signal. At 2 is shown the first derivative of this signal and at 3 is shown the second derivative. At 4 is shown the second derivative inverted. At 5 is shown the result of selecting only that part of the inverted second derivative having the same polarity as the first derivative, at 6a is shown waveform 1 delayed so that the mid-point of the transition coincides with the peak of waveform 5, and at 6b is shown the sum of waveforms 5 and 6a.

It can be seen that waveform 6b has sharper transitions, that is a shorter rise time than waveform 1. Since the amplitudes of the derivatives are proportional to the amplitude of the original transition, all the waveforms 1 through 6a, 6b, have proportional amplitudes, thus the shape of the transition in waveform 6b resulting from the above process is independent of the amplitude of the transition. The exact form of the transition in waveform 6b depends on the shape of the transitions in the original waveform 1. By adjustment of the amplitude of the clipped second derivative waveform 5 that is added to waveform 6a, overshoots in the resulting waveform 6b can be minimized. An alternative approach is to omit the inversion of the second derivative waveform. Instead, that part of the non-inverted waveform 3 having the same polarity as the first derivative, 2, is selected, yielding a waveform similar though not identical to that shown at 5, and advanced in time relative to waveform 1. If this clipped non-inverted second derivative is then delayed and added to waveform 1, a waveform similar to that shown at 6b having a sharper transition than that of waveform 1 and avoiding the delay which occurs between waveforms 1 and 6b is obtained, although due to the asymmetry of the clipped second derivative it is not possible to obtain an essentially flat top to the resultant waveform. For some applications however the reduced delay offered by this approach may be preferable.

The use of a clipped second derivative to add to the original waveform rather than the direct second derivative or the first derivative as sometimes employed in high-frequency peaking circuits has the advantage of producing less overshoot for a comparable steepness of the slope of the resulting transition.

The method described, of adding a proportion of a clipped second derivative having the same polarity as the first derivative to an appropriately delayed version of the original signal may be applied in the chrominance signal from the in-phase demodulator which is used to control the selection of foreground or background signal, thereby resulting in a sharper transition between these two signals.

It is a fifth feature of this invention that, by taking the clipped inverted second derivative waveform 5 of FIG. 2 and modulating it on to a subcarrier having the same frequency and phase as the reference input to the in-phase demodulator, and then adding an appropriate amplitude of this modulated subcarrier to an appropriately delayed version of the foreground video signal the rise times of chrominance transitions having the phase of the backing color (which are in the form of modulations on the color subcarrier of the foreground signal) may be shortened. This may be done prior to the chroma-key selection between foreground and background signals.

By sharpening the chrominance transitions in the foreground signal in this manner, the tendency for the color of edges of the foreground subject to tend to change toward the backing color within the subject area may be minimized. This tendency may be understood by referring again to FIG. 1. By considering the example of a red foreground subject it will be apparent that at the edges of this subject there will be transitions between the amplitude and phase of the subcarrier indicated as red, and the amplitude and phase of the backing color X. During these transitions the color will assume intermediate values between red and color X. However substitution of the background video signal does not occur until the amplitude and phase lie between the lines AA and BB and to the right of line ZZ. The suppression of the backing color previously described does not occur until the color lies between lines AA and BB and to the right of line YY. Hence there will be a portion of the transition in which the subject color has intermediate values between red and line YY which will tend to produce a discoloration of the edges of the subject. Application of the method described will reduce the width of the discolored area near the edges of the subject.

A sixth feature of this invention is a method of reinserting fine detail information into the chrominance signal to be used for controlling the selection of the foreground and background signals, which fine detail was lost due to bandwidth-limitation of the chrominance signal.

Figure 3:
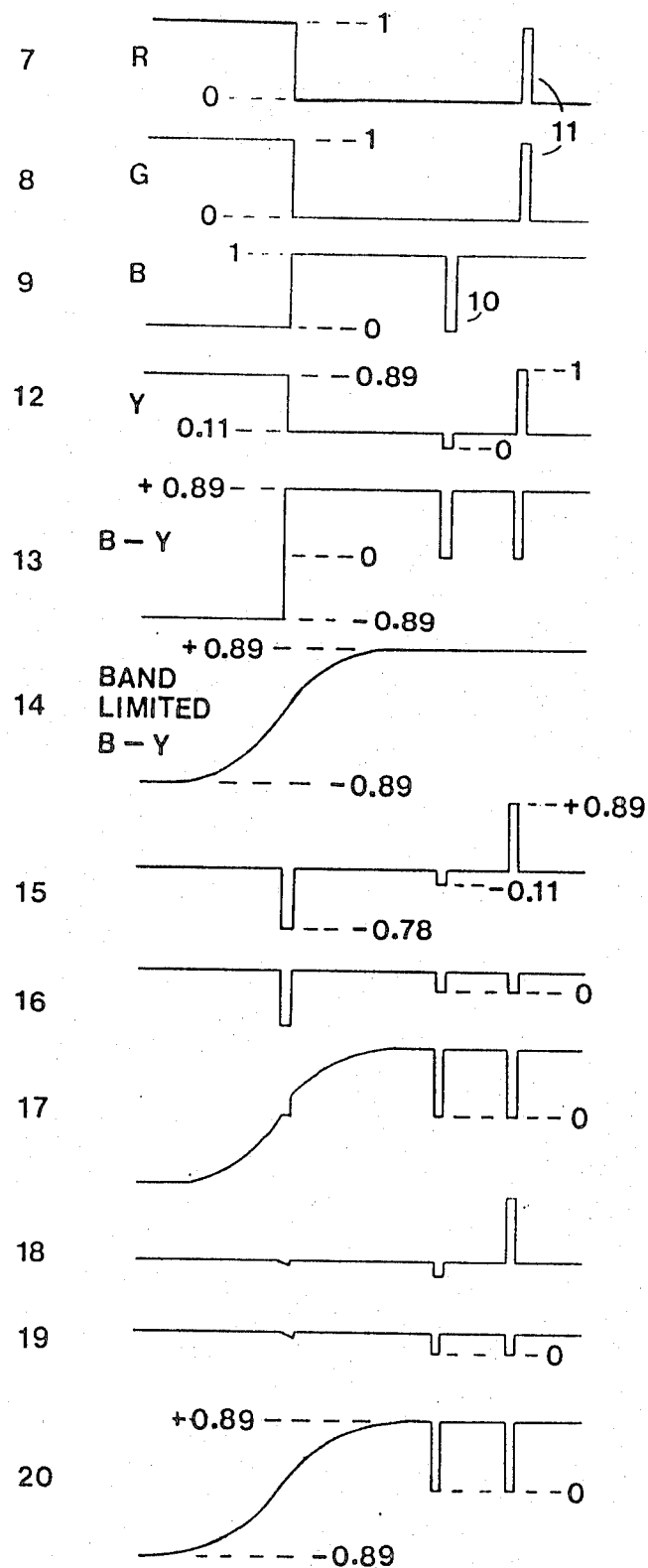
FIG. 3 shows waveforms illustrating the effects on fine detail in a television signal of the methods of this invention.

Referring to FIG. 3 there are shown, at 7, 8, 9, respectively, the waveforms which would be produced in the red, green, and blue outputs of a color television camera by a transition from a yellow subject to a blue backing color, where a thin black object 10 and a thin white object 11 have also been placed in front of the blue backing area. Also shown at 12 is the luminance signal Y which would be derived from the red, green, and blue signals, and at 13, the chrominance signal B-Y, before bandwidth-limiting, and at 14, the same chrominance signal after bandwidth-limiting. Numerical values typical of the voltages to be encountered in a standard (NTSC or PAL) color television system have been indicated at relevant points in the waveforms of FIG. 3.

It will be apparent that the information corresponding to the thin black and white lines has been lost in the bandwidth-limited signal. It will also be noted that prior to bandwidth-limiting, both and black and white lines resulted in a reduction in amplitude of the B-Y signal.

The B-Y chrominance signal has here been used by way of example, as has the assumption of a yellow subject and blue backing. It will be apparent to those skilled in the art that, for any color backing, the effect on the chrominance component having the same phase as the backing color of either a black or white object placed in front of the backing, is a reduction in amplitude of the chrominance signal, and that to a lesser extent this will apply for objects of shades of gray intermediate between black and white.

It will also be noted that, in the example shown, the changes in the Y signal produced by the black and by the white object are unequal, whereas in the B-Y signal before bandwidth-limiting they are equal.

If the Y signal is passed through a suitable high-pass filter an output such as shown at 15 in FIG. 3 will be obtained, having pulses corresponding to the black and white objects, and also to the transition between yellow and blue, but zero level in the areas of uniform luminance, either yellow or blue.

If waveform 15 is now applied to circuits which separately pass the positive and negative excursions, and invert the positive excursions and attenuate them, and then recombine the two signals so derived with an offset of the zero level, the waveform shown at 16 can be obtained, in which the pulses produced by the black and white objects are of similar amplitude.

If the bandwidth-limited B-Y signal 14 is now modulated by waveform 16, with the effect of the excursion in waveform 16 resulting from the yellow to blue transition being limited to no more than those of the excursions deriving from the black and white objects, waveform 17 is obtained. In this waveform the short excursions to zero resulting from the black and white objects have been reintroduced similar to those in the B-Y waveform 13 before bandwidth-limiting.

Thus if the waveform shown at 17 is used to control the selection of foreground and background signals (with the positive direction corresponding to the background) it will cause the selection process to revert to the foreground at the positions of the black and white objects which will therefore appear in the output chroma-key image.

However the luminance transition caused by the change from yellow to blue in the above example, that is the transition corresponding to the edge of the foreground subject, will also cause the selection process to select the foreground signal; this occurring at a time when the change to the background signal should be taking place.

To avoid this effect the waveform 15 may first be modulated by the bandwidth-limited B-Y signal, 14, producing the waveform shown at 18. Since the bandwidth-limited signal is passing through zero at the edge of the foreground subject, the excursion of waveform 15 at this time is reduced to low amplitude. However the excursions corresponding to the black and white objects may be adjusted to have the same amplitude as in waveform 15.

Waveform 19 may then be derived by the same method as used for deriving waveform 16. The bandwidth-limited B-Y signal, 14, when modulated by waveform 19 will appear as shown at 20 which is similar to waveform 17 except that the undesired effect of the luminance transition at the edge of the foreground subject has been essentially eliminated.

This last waveform is suitable for controlling the selection between foreground and background signals.

A seventh feature of this invention is an improved method of selection between the foreground and background signals. Conventionally this is performed by a switching circuit or a linear mixing circuit such that as the amplitude of one signal is increased the amplitude of the other is correspondingly reduced. However consideration of the situation which it is desired to simulate, that is having the foreground subject placed in front of the background scene will show that, if this were in reality the case, although the background image is modulated by the opacity of the foreground subject, the converse is not the case; the amplitude of the foreground image is unaffected by the background image. Reduction of the amplitude of the foreground signal as the background amplitude is increased will not therefore provide an accurate simulation of the intended scene.

The principal reason for reducing the foreground amplitude in prior art equipment has been to avoid visiblity of the backing color. With the use of the methods already described in this invention the backing color may be suppressed. Consequently it is not necessary to attenuate the amplitude of the foreground signal at the transition between foreground and background.

Accordingly the control signal, which has previously been referred to as that signal controlling selection of the foreground or background signals, may be applied to control the amplitude of the background signal only, and the foreground signal summed with the controlled background signal.

In practice if the foreground signal is directly summed with the controlled background signal, conditions can arise on transitions from, for example, a white area of foreground subject to a white area of background, where the peak amplitude of the sum of the two signals exceeds the maximum permissible peak white level during the transition. To avoid such an occurrence it is preferable to employ a non-additive mixing circuit, that is a curcuit which provides an output equal to the greater of the two inputs (foreground and background), in place of a simple summation of the two signals.

It is also desirable in practice to arrange that the foreground signal will be suppressed when the chrominance signal indicating the presence of the backing color has reached its full amplitude. The methods of this invention previously described provide for suppression of the chrominance in the backing area and for cancellation of the average luminance contribution of the backing. The luminance cancellation is however only approximate and does not allow for variations of the backing luminance from its average value. Supression of the foreground signal when the transition from subject to backing has been completed, that is when the backing chrominance has attained full amplitude, will avoid any luminance contribution from the backing appearing in the output image.

One method of implementing the features of this invention described above is illustrated in FIG. 4. It is to be understood that this method is given by way of example and other methods for performing the processes described in the preceding description of the features of this invention will occur to those skilled in the art. It is also to be understood that the features of this invention may be employed either separately or in combination, and their illustration in combination in FIG. 4 does not preclude the separate use of individual features or separate use of the sections of the block diagram of FIG. 4 which implement these separate features.

Figure 4:
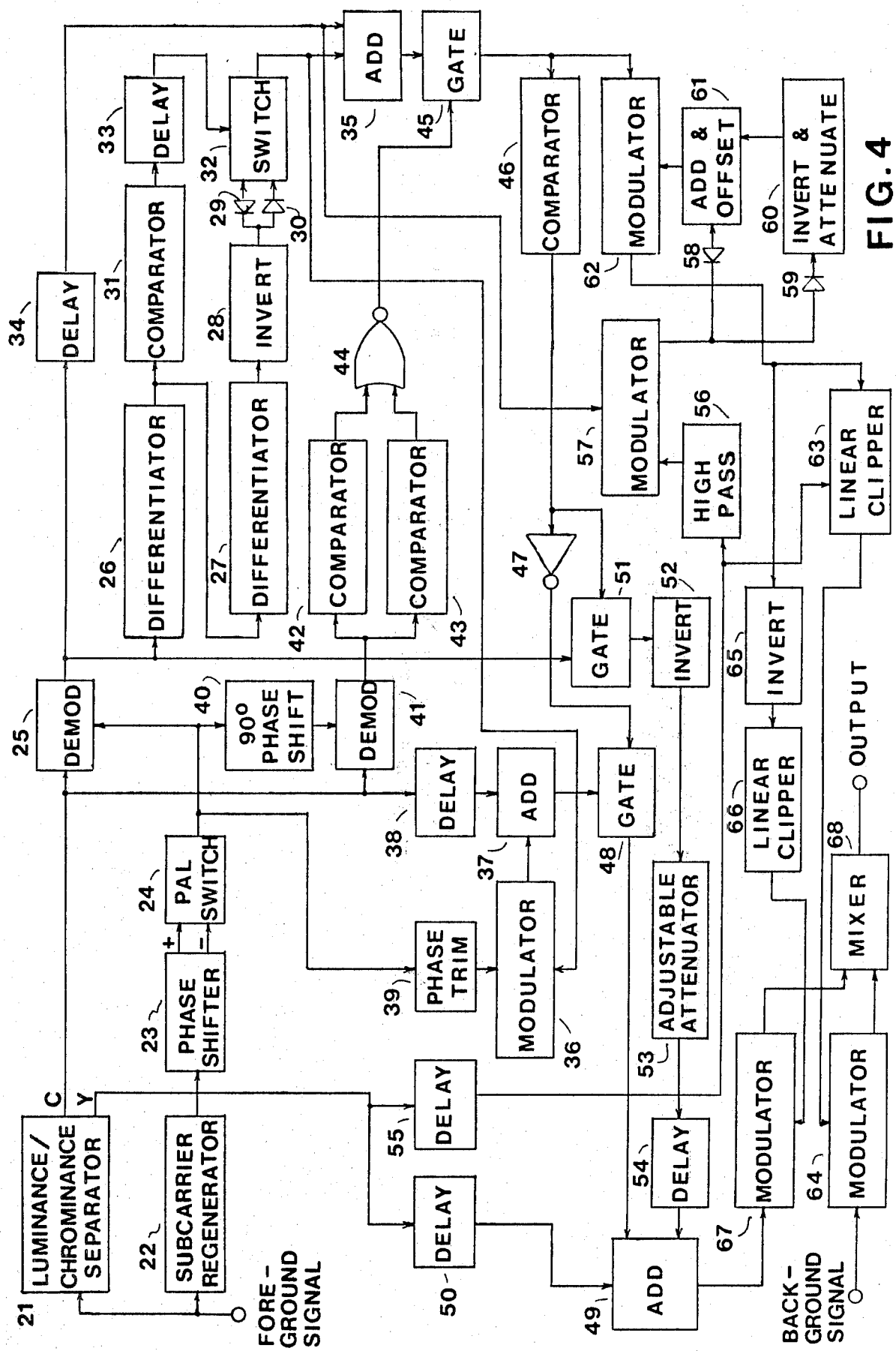
FIG. 4 shows a general block diagram of one method of implementation of the features of this invention.

Referring to FIG. 4, the foreground video signal is first applied to circuit which separate the luminance and chrominance, 21. While simple low-pass and band-pass filters may be used for this purpose, a comb filter is to be preferred. Such filters are known art and not part of this invention. Note that the chrominance output remains in the form of a modulated subcarrier.

A subcarrier regenerator 22 of conventional design is locked to the color burst of the foreground video signal to provide a subcarrier phase reference. This reference subcarrier is fed to an adjustable phase shifter 23 the function of which is to select the phase corresponding to the backing color. Preferably this phase shifter should have a range of 360°. It is shown as having two outputs marked + and − which correspond to phases leading and lagging the input phase by equal angles. These two outputs are required for use with the PAL system. PAL switch 24 selects between them, changing between leading and lagging phase on alternate television lines. For use with NTSC color signals, PAL switch 24 may be omitted and only a single output from phase shifter 23 is required.

The chrominance signal is fed to synchronous demodulator 25, the reference phase input to which is selected (by phase shifter 23) to be in phase with the color of the backing in the input foreground signal. The output of synchronous demodulator 25 is fed to differentiator 26 which provides the first derivative of the signal, which in turn feeds differentiator 27 which provides the second derivative. The latter is inverted by inverter 28 and transitions of different polarities separated by diodes 29 and 30. The first derivative is also fed to comparator 31 which produces one or other of two voltage levels according to the polarity of the first derivative. The comparator output controls switch 32 to select the excursions of the inverted second derivative having the same polarity as the first derivative. Delay 33 ensures that the timing of this control voltage will coincide with the desired part of the second derivative waveform.

The selected part of the inverted second derivative waveform is added to an output from demodulator 25, delayed by delay 34, in adder 35.

The parts of the system comprising differentiators 26 and 27, comparator 31, inverter 28, diodes 29 and 30, switch 32, delays 33 and 34, and adder 35 function in the manner already described in connection with FIG. 2 to produce a signal in which the rise times of transitions are faster than in the original signal.

An output from switch 32 is also modulated on to the subcarrier frequency by modulator 36 the output of which is added by adder 37 to a feed of the chrominance signal which has been delayed by delay 38. Adjustable phase trim device 39 enables the phase of subcarrier supplied to modulator 36 to be set to correspond with the backing color phase in the chrominance signal after delay 38. As previously explained the result of this action is to sharpen transitions in that component of the chrominance signal (in the form of a modulated subcarrier) which is in phase with the backing color.

The reference signal applied to demodulator 25 is also applied, by way of 90° phase shifter 40 to synchronous demodulator 41 which is also fed with the chrominance signal, and therefore produces an output of the chrominance component that is in quadrature with the phase of the backing color. This output is fed to two comparators, 42 and 43 which are biased so that comparator 42 will produce an output when the amplitude of the quadrature component exceeds a preset amount in one polarity and comparator 43 will produce an output when the amplitude exceeds a preset amount in the opposite polarity. The comparator outputs are fed to NOR gate 44. The output of this gate will be at its high level only when the amplitude of the quadrature component lies between the two preset values, which correspond with the lines AA and BB of FIG. 1. This output controls analog gate 45 which will therefore pass the demodulated chrominance signal from adder 35 only when its amplitude and phase lie between lines AA and BB of FIG. 1. This and subsequent analog gates are such as to pass the input signal linearly when the control signal is at a high level, and to prevent passage of the input signal when the control signal is at a low level.

The signal passed by gate 45 is fed to comparator 46 which produces an output at any time this signal has an amplitude greater than zero with the polarity corresponding to the backing color. This output is inverted by inverter 47 and controls analog gate 48 which determines whether the chrominance signal from adder 37 will be passed to adder 49. The latter adder 49 recombines the chrominance with the luminance component of the foreground signal which is delayed by delay 50 to match the delay of the chrominance in delay 38. The result is to re-form the composite signal, except when the color corresponds with the backing color, when the chrominance will not be passed by gate 48. Thus in any areas of the image initially having the backing color, color will be suppressed.

The output of comparator 46 also enables analog gate 51 thus passing the demodulated chrominance from demodulator 25 only in areas having the backing color.

This signal is inverted by inverter 52, attenuated by adjustable attenuator 53 and delayed by delay 54 to match the timing of the luminance and chrominance inputs to adder 49, in which it is then summed with these two signals. By adjusting attenuator 53 this inverted signal may be made to cancel the luminance in the areas of the backing, leaving an image containing the foreground subject against a background of black.

A feed of the luminance signal is taken through delay 55, (to match the timing of the demodulated chrominance signal), and high-pass filter 56 which passes only those frequencies corresponding to fine detail. The response of this filter should be shaped so as to minimize overshoots on the outputs resulting from steps in its input.

The high-frequency luminance components are then modulated by the delayed demodulated chrominance in modulator 57. As explained in connection with FIG. 3 this minimizes the effect of the transitions from foreground subject to backing color. Transients of differing polarity are then separated by diodes 58 and 59, and the positive transients inverted and attenuated by inverter and attenuator 60 to match the amplitude of the negative transients. The transients are then recombined, and an offset added, by adder 61, the output of which will have the form shown at 19 in FIG. 3. This signal is supplied to modulator 62 where it modulates the signal from gate 45. The resulting signal is representative of the occurrence of the backing color, with a representation of the fine detail which has been lost due to the bandwidth limitation of the chrominance having been synthesized from the high frequency luminance components.

This signal is then applied to linear clipper 63 which is such that it will pass linearly a preset range of amplitudes of the signal but clip any excursions of the signal exceeding this range. This range is normally set to include the range of amplitudes of the chrominance signal which obtain when the foreground image signal corresponds to the backing. It is desirable, but not essential, that the lower clipping level of linear clipper 63 at which it starts to pass the signal from modulator 62, and thereby cause modulator 64 to commence to pass the background signal, should be a function of the luminance of the foreground signal. Spurious coloration of high luminance areas of the foreground subject (due to camera color unbalance or scattered light from the backing) can thus be prevented from causing unwanted appearances of the background image. This may be achieved by raising the lower clipping level of linear clipper 63 when the luminance signal has values appreciably higher than the luminance of the backing. A similar procedure may also be applied when the luminance is much lower than that of the backing to avoid the possibility of unwanted insertion of the background image in near-black areas of the foreground scene due to camera black-level unbalance. A feed of the luminance signal, taken from the output of delay 55, is shown applied to linear clipper 63 to perform these functions.

The background image signal is applied to modulator 64 where it is modulated by the output of linear clipper 63. This results in the amplitude of the background signal being proportional to the intensity of the chrominance signal which represents the backing color in the foreground image signal. This proportionality applies over the linear range of linear clipper 63 which may be adjusted so that the intensity of the background signal will follow variations in intensity of the backing color, such as those due to shadows of the foreground subject, or instead may cause the background signal to remain at full amplitude over a range of variation of the intensity of the backing color in order to ignore such shadows.

The output of modulator 62 is inverted by inverter 65 and applied to a second linear clipper 66, the operation of which is similar to linear clipper 63, however the range over which linear response is obtained is differently set. Normally this range is set so that the output will change from one limiting value to the other limiting value over a small range of amplitude of the input corresponding to the backing color being at or near full intensity. The output of this clipper controls modulator 67 to which is fed the signal from adder 49, that is the foreground signal after processing to remove the backing color and sharpen the chrominance transitions. As previously explained, the signal corresponding to the foreground subject should not be modulated by the signal indicating the presence of the backing color except when this latter signal is close to full amplitude indicating that no subject detail is present, at which point the foreground signal may be suppressed to avoid luminance variations in the backing appearing in the final output. The range of linear clipper 66 is set to produce this result.

The modulated foreground and modulated background signals are then combined in mixer 68. It is possible to add the two signals linearly, however a preferred form for mixer 68 is one in which the output is equal to the greater of the two inputs, known as a non-additive mixer. This avoids the possibility of excessively high amplitudes of signal occurring on transitions from a foreground subject at or near white level to a background signal which is also at or near white level.

The output of mixer 68 is the desired chroma-key combination in which the foreground subject appears to be in front of the background scene.

While the preceding description has been primarily oriented to the use of encoded composite video signals for the generation of the signal which controls selection of foreground or background, use is frequently made, in the application of chroma-key techniques, of direct feeds of the red, green and blue signals from the foreground camera to generate the control signal, while retaining the encoded foreground and background signals as the signals between which selection is made to form the combined image. The methods of this invention may also be applied to this form of chroma-key, by substituting signals derived from the direct red, green and blue signals for the outputs of synchronous demodulators 25 and 41.

It will be apparent to those skilled in the art that the outputs of these synchronous demodulators will be of the forms $$(R-Y) \sin \theta + (B-Y) \cos \theta$$

and $(R-Y) \cos \theta - (B-Y) \sin \theta$ where $\theta$ is the phase angle relative to the $(B-Y)$ phase of the reference supplied to demodulator 25 and R, B and Y are as previously defined. Signals of the forms given in the above expressions may be derived from the red, green and blue signals by known means and substituted for the outputs of demodulators 25 and 41. In other respects the methods of this invention function as previously described for use with the control signal derived from the encoded foreground signal.

While there have been illustrated and described various embodiments of the present invention it will be apparent that various changes and modifications thereof will occur to those skilled in the art. It is intended in the appended claims to cover all such changes and modifications as fall within the true spirit and scope of the present invention.

What is claimed and desired to be secured by Letters Patent of the United States is:

1. Apparatus for combining a signal, including a color subcarrier, representing a first television image and a signal representing a second television image to produce a signal representing a combined image having the picture content of said first television image except in those areas of said first television image having a chosen color, the picture content of said combined image in said areas of said chosen color being the picture content of said second television image, whereby objects in said first television image of colors other than said chosen color will appear in said combined image to be in front of said second television image; incorporating a means of determination of the occurrence of said chosen color and preventing undesired response to other colors, comprising:

a. First means for providing an output responsive to the amplitude and phase of said color subcarrier, said first means responding preferentially to said subcarrier when having a phase corresponding to the phase resulting from the presence of said chosen color in said first television image, b. Second means for providing an output responsive to the amplitude and phase of said subcarrier responding preferentially when said phase of said subcarrier differs from that phase to which said first means responds preferentially, c. Means responsive to the amplitude of the output of said second means causing a first inhibit signal to be present whenever said output of said second means exceeds a first chosen value of one polarity and causing a second inhibit signal to be present whenever said output of said second means exceeds a second chosen value having opposite polarity to said first chosen value, d. Control means whereby the output of said first means responsive to the amplitude and phase of said subcarrier controls the combination of said first television image and said second television image, to form said combined image, and e. Means for the application of said first and second inhibit signals to said control means, the presence of said first inhibit signal inhibiting said control means from including said second television image in said combined image, and likewise, the presence of said second inhibit signal inhibiting said control means from including said second television image in said combined image, whereby the range of colors in said first television image causing said control means to include said second television image may be constrained.

2. Apparatus for combining a signal representing a first television image and a signal representing a second television image to produce a signal representing a combined image having the picture content of said first television image except in those areas of said first television image having a chosen color, the picture content of said combined image in said areas of said chosen color being the picture content of said second television image, whereby objects in said first television image of colors other than said chosen color will appear in said combined image to be in front of said second television image; incorporating, a means of determination of the occurrence of said chosen color and preventing undesired response to other colors, comprising:

a. First means for providing an output comprised of a first combination of two chrominance signals derived from said first television image, said two chrominance signals being distinct and different combinations of the red, green and blue signals generated by a color television signal source, said first combination being such as to have a preferred amplitude and polarity in the presence of said chosen color in said first television image, b. Control means whereby the output of said first means controls the combination of said first television image and said second television image to form said combined image, c. Second means for providing an output comprised of a second combination of said two chrominance signals, said second combination containing different proportions of said two chrominance signals from said first combination, d. means responsive to the amplitude of said output of said second means causing a first inhibit signal to be present whenever said amplitude of said output of said second means exceeds a first chosen value of one polarity and causing a second inhibit signal to be present whenever said amplitude of said output of said second means exceeds a second chosen value having opposite polarity to said first chosen value, and e. Means for the application of said first and second inhibit signals to said control means, the presence of said first inhibit signal inhibiting said control means from including said second television image in said combined image, and likewise, the presence of said second inhibit signal inhibiting said control means from including said second television image in said combined image, whereby the range of colors in said first television image causing said control means to include said second television image may be constrained.

3. Apparatus for combining a signal, including a color subcarrier, representing a first television image and a signal representing a second television image to produce a signal representing a combined image having the picture content of said first television image except in those areas of said first television image having a chosen color, the picture content of said combined image in said areas of said chosen color being the picture content of said second television image, whereby objects in said first television image of colors other than said chosen color will appear in said combined image to be in front of said second television image; and wherein the undesired appearance of said chosen color, deriving from said first television image, may be prevented, comprising:

a. Means for separating the luminance and chrominance components of said signal representing said first television image, b. Means for detecting the presence of said chosen color in said first television image, and providing indication thereof, c. Means for suppression of said chrominance component of said signal representing said first television image when said means for detecting the presence of said chosen color provides indication of such presence, d. Means for recombining said luminance component and said chrominance component following said means for suppression, to form a composite television signal, whereby said composite television signal will correspond with said signal representing said first television image except that in those areas of said first television image having said chosen color no color will appear, and e. Means for combining said composite television signal with the signal corresponding to said second television image to produce a combined image.

4. Apparatus as recited in claim 3 wherein said means for detecting the presence of said chosen color in said first television image and providing indication thereof comprises:
   a. First means for providing an output responsive to the amplitude and phase of said color subcarrier, said first means responding preferentially to said subcarrier when having a phase corresponding to the phase resulting from the presence of said chosen color in said first television image,
   b. Second means for providing an output responsive to the amplitude and phase of said subcarrier responding preferentially when said phase of said subcarrier differs from that phase to which said first means responds preferentially,
   c. Means responsive to the amplitude of the output of said second means causing a first inhibit signal to be present whenever said output of said second means exceeds a first chosen value of one polarity and causing a second inhibit signal to be present whenever said output of said second means exceeds a second chosen value having opposite polarity to said first chosen value,
   d. Indicating means providing indication of the correspondence of the polarity of said output of said first means with that polarity occurring when said first television image has said chosen color, and of the amplitude of said output of said first means having any of a range of amplitudes corresponding to that range of amplitudes occurring when said first television image has any of a range of intensities of said chosen color, and
   e. Means for the application of said first and second inhibit signals to said indicating means, the presence of said first inhibit signal inhibiting said indicating means from providing said indication, and likewise the presence of said second inhibit signal inhibiting said indicating means from providing said indication, whereby the range of colors in said first television image causing said indicating means to provide indication may be constrained to a range representative of said chosen color and colors similar thereto.

5. Apparatus as recited in claim 3 wherein said means for detecting the presence of said chosen color in said first television image and providing indication thereof comprises:
   a. First means for providing an output comprised of a first combination of two chrominance signals derived from said first television image, said two chrominance signals being distinct and different combinations of the red, green and blue signals generated by a color television signal source, said first combination being such as to have a preferred amplitude and polarity in the presence of said chosen color in said first television image,
   b. Second means for providing an output comprised of a second combination of said two chrominance signals, said second combination containing different proportions of said two chrominance signals from said first combination,
   c. Means responsive to the amplitude of the output of said second means causing a first inhibit signal to be present whenever said output of said second means exceeds a first chosen value of one polarity and causing a second inhibit signal to be present whenever said output of said second means exceeds a second chosen value having opposite polarity to said first chosen value,
   d. Indicating means providing indication of the correspondence of the polarity of said output of said first means with that polarity occurring when said first television image has said chosen color, and of the amplitude of said output of said first means having any of a range of amplitudes corresponding to that range of amplitudes occurring when said first television image has any of a range of intensities of said chosen color, and
   e. Means for the application of said first and second inhibit signals to said indicating means, the presence of said first inhibit signal inhibiting said indicating means from providing said indication, and likewise the presence of said second inhibit signal inhibiting said indicating means from providing said indication, whereby the range of colors in said first television image causing said indicating means to provide indication may be constrained to a range representative of said chosen color and colors similar thereto.

6. Apparatus as recited in claim 3 wherein the undesired appearance of the luminance component of said chosen color deriving from said first television image may be prevented, comprising:
   a. Means for producing a signal proportional to the amplitude of the chrominance component resulting from the occurrence of said chosen color in said first television image
   b. Means for varying the amplitude of said signal proportional to said chrominance component, and producing an output thereof, and
   c. Means for subtracting said output from said luminance component whereby the amplitude of said luminance component may be diminished in areas of said chosen color by adjustment of said means for varying the amplitude of said signal proportional to said chrominance component.

7. Apparatus as recited in claim 6 wherein said means for producing said signal proportional to the amplitude of said chrominance component comprises:
   a. First means for providing an output responsive to the amplitude and phase of said color subcarrier, said first means responding preferentially to said subcarrier when having a phase corresponding to the phase resulting from the presence of said chosen color in said first television image,
   b. Second means for providing an output responsive to the amplitude and phase of said subcarrier responding preferentially when said phase of said subcarrier differs from that phase to which said first means responds preferentially,
   c. Means responsive to the amplitude of the output of said second means causing a first inhibit signal to be present whenever said output of said second means exceeds a first chosen value of one polarity and causing a second inhibit signal to be present whenever said output of said second means exceeds a second chosen value having opposite polarity to said first chosen value,
   d. Signal producing means for producing a signal proportional to said output of said first means, and
   e. Means for the application of said first and second inhibit signals to said signal producing means, the presence of said first inhibit signal inhibiting production of a signal by said signal producing means, and likewise the presence of said second inhibit signal inhibiting production of a signal by said signal producing means, whereby the production of said signal proportional to said chrominance component may be restricted to occur only when said chrominance component is representative of a range of colors similar to said chosen color.

8. Apparatus as recited in claim 6 wherein said means for producing said signal proportional to the amplitude of said chrominance component comprises:
   a. First means for providing an output comprised of a first combination of two chrominance signals derived from said first television image, said two chrominance signals being distinct and different combinations of the red, green and blue signals generated by a color television signal source, said first combination being such as to have a preferred amplitude and polarity in the present of said chosen color in said first television image,
   b. Second means for providing an output comprised of a second combination of said two chrominance signals, said second combination containing different proportions of said two chrominance signals from said first combination,
   c. Means responsive to the amplitude of the output of said second means causing a first inhibit signal to be present whenever said output of said second means exceeds a first chosen value of one polarity and causing a second inhibit signal to be present whenever said output of said second means exceeds a second chosen value having opposite polarity to said first chosen value,
   d. Signal producing means for producing a signal proportional to said output of said first means, and
   e. Means for the application of said first and second inhibit signals to said signal producing means, the presence of said first inhibit signal inhibiting production of a signal by said signal producing means, and likewise the presence of said second inhibit signal inhibiting production of a signal by said signal producing means, whereby the production of said signal proportional to said chrominance component may be restricted to occur only when said chrominance component is representative of a range of colors similar to said chosen color.

9. Apparatus for combining a first television image and a second television image to produce a combined image having the picture content of said first television image except in those areas of said first television image having a chosen color, the picture content of said combined image in said areas of said chosen color being the picture content of said second television image, whereby a sharp transition between objects in said first television image of colors other than said chosen color and objects in said second television image may be obtained; comprising:
   a. Means for detecting the presence of said chosen color and for producing a first control signal having an amplitude representative of a function of the intensity of said chosen color, said first control signal changing between distinct voltage levels in correspondence with boundaries between areas of said chosen color and other areas of other colors in said first television image,
   b. First differentiating means for producing a first derivative signal proportional to the first derivative with respect to time of said first control signal,
   c. Second differentiating means for producing a second derivative signal proportional to the second derivative with respect to time of said first control signal,
   d. Means for detecting the polarity of said first derivative signal,
   e. Means for separating those parts of said second derivative signal having positive polarity to form a first correction signal and means for separating those parts of said second derivative signal having negative polarity, to form a second correction signal,
   f. Means for selecting between said first correction signal and said second correction signal determined by said polarity of said first derivative signal, to form a third correcting signal,
   g. Means for producing a delayed version of said third correction signal,
   h. Means for adding a selected proportion of said delayed version of said third correction signal to said first control signal, to produce a second control signal, whereby the times of rise and fall of transitions in amplitude of said second control signal may be made shorter than the times of rise and fall of the corresponding transitions in said first control signal from which said transitions in amplitude of said second control signal derive, and
   i. Means whereby said second control signal controls the combination of said first television image and said second television image to form said combined image.

10. Apparatus as recited in claim 9 wherein:
    a. Means are included for inverting said second derivative signal prior to being applied to said means for separating those parts having positive polarity to form said first correction signal and to said means for separating those parts having negative polarity to form said second correcting signal,
    b. Said means for producing a delayed version of said third correcting signal being instead employed to produce a delayed version of said first control signal, and
    c. Means are provided for adding a selected proportion of said third correcting signal to said delayed version of said first control signal to produce said second control signal whereby the times of rise and fall of transitions in amplitude of said second control signal may be made shorter than the times of rise and fall of the corresponding transitions in said first control signal from which said transitions in amplitude of said second control signal derive and whereby overshoots and undershoots in said second control signal following said transitions in amplitude may be minimized.

11. Apparatus for combining a signal, including a color subcarrier, representing a first television image and a signal representing a second television image to produce a signal representing a combined image having the picture content of said first television image except in those areas of said first television image having a chosen color, the picture content of said combined image in said areas of said chosen color being the picture content of said second television image, whereby objects in said first television image of colors other than said chosen color will appear in said combined image to be in front of said second television image; transitions of the color subcarrier of said first television image between said chosen color and any other color being sharpened by reducing the times of rise and fall of the modulation of said color subcarrier in comparison to the times of rise and fall of said modulation in the original signal corresponding to said first television image, whereby the visibility of said chosen color in said combined image at boundaries between said picture content of said first television image and said picture content of said second television image may be reduced, comprising:

a. Means for separating the luminance and color subcarrier components of the signal corresponding to said first television image, b. Means for indicating the presence of said chosen color and for producing an indicating signal having an amplitude representative of a function of the intensity of said chosen color, said indicating signal changing between distinct voltage levels in correspondence with boundaries between areas of said chosen color and other areas of other colors in said first television image, c. First differentiating means for producing a first derivative signal proportional to the first derivative with respect to time of said indicating signal, d. Second differentiating means for producing a second derivative signal proportional to the second derivative with respect to time of said indicating signal, e. Means for detecting the polarity of said first derivative signal, f. Means for separating those parts of said second derivative signal having positive polarity to form a first correction signal and means for separating those parts of said second derivative signal having negative polarity, form a second correction signal, g. Means for selecting between said first correction signal and said second correction signal determined by said polarity of said first derivative signal, to form a third correction signal, h. Means for producing a delayed version of said third correction signal, i. Means for modulating the amplitude of a subcarrier, having the same frequency and phase as the subcarrier component of said signal representing said first television image in areas of said chosen color, with said delayed version of said third correction signal to produce a modulated correction signal, j. Means for adding a selected proportion of said modulated correction signal to said subcarrier contained in said signal representing to said first television image, to produce a subcarrier component having sharpened transitions, k. Means for recombining said luminance component and said subcarrier component having sharpened transitions to form a composite television signal, whereby said composite television signal will correspond with said signal corresponding to said first television image except that transitions of the subcarrier component at boundaries between said chosen color and any other color will be sharper, and l. Means for combining said composite television signal with the signal corresponding to said second television image to produce a combined image.

12. Apparatus as recited in claim 11 wherein:

a. Means are included for inverting said second derivative signal prior to being applied to said means for separating those parts having positive polarity to form said first correction signal and to said means for separating those parts having negative polarity to form said second correction signal, b. Said means for producing a delayed version of said third correction signal instead are employed to produce a delayed version of said subcarrier included in said signal representing to said first television image, c. Means are provided for modulating the amplitude of a subcarrier having the same frequency and phase as the subcarrier component of said first television image in areas of said chosen color with said third correction signal to produce a modulated correction signal, d. Means are provided for adding a selected proportion of said modulated correction signal to said delayed version of said subcarrier included in said signal representing to said first television image, to produce a sharpened subcarrier component.

e. Means are provided for producing a delayed version of said luminance component of said signal representing to said first television image whereby said luminance component is delayed by the same amount as said delayed version of said subcarrier, and f. Means are provided for recombining said sharpened subcarrier component with said delayed version of said luminance component of said signal representing said first television image to form a composite television signal.

13. Apparatus for combining a first television image and a second television image to produce a combined image having the picture content of said first television image except in those areas of said first television image having a chosen color, the picture content of said combined image in said areas of said chosen color being the picture content of said second television image, whereby objects in said first television image of colors other than said chosen color will appear in said combined image to be in front of said second television image; wherein improved rendition in said combined image of fine details appearing in said first television image in front of areas of said chosen color may be obtained, comprising:

a. Means for separating the luminance and chrominance components of the signal corresponding to said first television image, b. Means for detecting the presence of said chosen color in said first television image and of producing a first control signal representative of the intensity of said chosen color in said first television image, c. Means for separating the frequency components of said luminance component of said signal corresponding to said first television image and of providing a high-frequency signal containing those of said frequency components having frequencies greater than the frequencies contained in said first control signal, d. Means for separating the voltage excursions contained in said high-frequency signal having positive polarity and means for separating said voltage excursions having negative polarity, e. Means for inverting and for attenuating said voltage excursions having positive polarity to produce a first modulating signal, f. Means for adding said voltage excursions having negative polarity to said first modulating signal and for adding a positive voltage thereto to produce a second modulating signal having a voltage range between zero and a positive value, g. Means for modulating said first control signal by said second modulating signal to produce a second control signal, whereby said second modulating signal, being derived as described above from said high-frequency signal, causes said second control signal to be reduced in amplitude by the presence of said voltage excursions contained in said high-frequency signal, and h. Means whereby said second control signal controls the combination of said first television image and said second television image to form said combined image.

14. Apparatus as recited in claim 13 wherein said high-frequency signal is modulated by said first control signal prior to application to said means for separating the voltage excursions contained in said high-frequency signal having positive polarity and said means for separating said voltage excursions having negative polarity.

15. Apparatus as recited in claim 3, wherein said means for combining said composite television signal with the signal corresponding to said second television image to produce said combined image comprises:

a. means for producing a control signal representative of the intensity of said chosen color in said first television image, b. First clipping means for passing said control signal linearly within a range of amplitudes of said control signal and for limiting said range of amplitudes to have a minimum amplitude value and a maximum amplitude value, to form a first clipped control signal, c. Means for modulating said signal representing to said second television image by said first clipped control signal to produce a first modulated signal having zero amplitude when said first clipped control signal has its minimum amplitude value and having maximum amplitude when said first clipped control signal has its maximum amplitude, d. Second clipping means for passing said control signal linearly within a range of amplitudes of said control signal and for limiting said range of amplitudes to have a minimum amplitude value and a maximum amplitude value, to form a second clipped control signal, e. Means for modulating said composite television signal by said second clipped control signal to produce a second modulated signal having zero amplitude when said second clipped control signal has its maximum amplitude, and having maximum amplitude when said second clipped control signal has its minimum amplitude, and f. Means for combining said first modulated signal and said second modulated signal to produce a combined signal representing said combined image.

16. Apparatus as recited in claim 15, wherein said means for combining said first modulated signal and said second modulated signal comprises non-additive mixing means producing an output proportional to the greater of said first modulated signal and said second modulated signal.

17. Apparatus as recited in claim 3 wherein said means for combining said composite television signal with the signal corresponding to said second television image to produce said combined image includes means for inhibiting insertion of said second television image when the luminance of said first television image differs from that of said chosen color, comprising:

a. means for producing a control signal representative of the intensity of said chosen color in said first television image, b. first clipping means for passing said control signal linearly within a range of amplitudes, and for limiting said range of amplitudes to have a minimum amplitude value and a maximum amplitude value, to form a first clipped control signal, said maximum amplitude value being controlled by said luminance component so as to be reduced to be equal to said minimum amplitude value for values of said luminance component significantly different from the luminance value of said chosen color, whereby said control signal will be held at said minimum value in areas of said first television image having chrominance value similar to, but luminance values different from, those of said chosen color.

c. means for modulating said signal representing said second television image by said first clipped control signal to produce a first modulated signal having zero amplitude when said first clipped control signal has its minimum amplitude value and having maximum amplitude when said first clipped control signal has its maximum amplitude, d. second clipping means for passing said control signal linearly within a range of amplitudes, and for limiting said range of amplitudes to have a minimum amplitude value and a maximum amplitude value, to form a second clipped control signal, said minimum amplitude value being controlled by said luminance component so as to be increased to be equal to said maximum value for values of said luminance component significantly different from the luminance value of said chosen color, e. means for modulating said composite television signal by said second clipped control signal to produce a second modulated signal having zero amplitude when said second clipped control signal has its maximum amplitude, and having maximum amplitude when said second clipped control signal has its minimum amplitude, and f. means for combining said first modulated signal and said second modulated signal to produce a combined signal representing said combined image.

* * * * *